US007635045B2

(12) United States Patent
Shearer et al.

(10) Patent No.: US 7,635,045 B2
(45) Date of Patent: Dec. 22, 2009

(54) MACHINE TOOL CONTROL CONSOLE

(75) Inventors: Daniel Edward Shearer, Metamora, IL (US); Craig B. Kelley, Dunlap, IL (US); Royce E. Leaders, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 552 days.

(21) Appl. No.: 10/902,289

(22) Filed: Jul. 30, 2004

(65) Prior Publication Data

US 2006/0021819 A1 Feb. 2, 2006

(51) Int. Cl.
*B60K 26/00* (2006.01)
*B62D 1/22* (2006.01)

(52) U.S. Cl. ....................... 180/315; 180/321; 180/324; 180/333; 180/334

(58) Field of Classification Search ................. 180/315, 180/321, 324, 333, 334; 74/473.12, 525, 74/544, 546; 200/6 A, 310, 311, 312, 313, 200/314, 315, 316, 317, 4, 1 R
See application file for complete search history.

(56) References Cited

U.S. PATENT DOCUMENTS 3,580,636 A 5/1971 Setto
4,055,230 A 10/1977 Kestian et al.
4,140,200 A 2/1979 Tucek
4,200,166 A 4/1980 Hansen
4,392,546 A 7/1983 Brown et al.
4,476,954 A 10/1984 Johnson et al.
4,478,308 A 10/1984 Klaassen
4,574,651 A 3/1986 Nordström
4,699,239 A 10/1987 Ishino et al.
4,702,520 A 10/1987 Whisler et al.
4,738,417 A 4/1988 Wenger
4,895,039 A 1/1990 Hegg
4,895,040 A 1/1990 Soederberg
4,913,573 A * 4/1990 Retter ........................ 400/489
4,914,976 A 4/1990 Wyllie
4,917,516 A * 4/1990 Retter ........................ 400/489
5,042,314 A 8/1991 Rytter et al.
D323,279 S 1/1992 Soederberg
5,086,870 A 2/1992 Bolduc
5,182,961 A 2/1993 Menahem et al.

(Continued)

FOREIGN PATENT DOCUMENTS

EP 0911548 A2 * 4/1999

(Continued)

OTHER PUBLICATIONS

Belkin Nostromo n50 SpeedPad, OnePC.NET, dated Nov. 13, 2001.*

(Continued)

*Primary Examiner*—Paul N. Dickson
*Assistant Examiner*—Joselynn Y. Sliteris
(74) *Attorney, Agent, or Firm*—Finnegan, Henderson, Farabow, Garrett & Dunner

(57) ABSTRACT

A control console for a work machine having at least one work tool has a rest and a plurality of operator control devices. The plurality of operator control devices are adjustable relative to the rest and configured to control at least one function of the at least one work tool.

47 Claims, 4 Drawing Sheets

U.S. PATENT DOCUMENTS

| | | | | |
|---|---|---|---|---|
| 5,244,066 | A | 9/1993 | Mackoway et al. | |
| 5,286,078 | A | 2/1994 | Mottino et al. | |
| 5,379,663 | A | 1/1995 | Hara | |
| 5,429,037 | A | 7/1995 | Weber et al. | |
| 5,448,028 | A | 9/1995 | Filion et al. | |
| 5,481,263 | A * | 1/1996 | Choi | 341/20 |
| 5,503,040 | A | 4/1996 | Wright | |
| 5,520,258 | A | 5/1996 | Kemshall | |
| 5,521,596 | A * | 5/1996 | Selker et al. | 341/22 |
| 5,566,778 | A | 10/1996 | Valier et al. | |
| 5,743,666 | A * | 4/1998 | VanZeeland et al. | 400/485 |
| 5,805,256 | A | 9/1998 | Miller | |
| 5,887,669 | A | 3/1999 | Ostler et al. | |
| 5,924,515 | A | 7/1999 | Stauffer | |
| 5,938,282 | A | 8/1999 | Epple | |
| 5,960,903 | A | 10/1999 | Abels et al. | |
| H1831 | H | 2/2000 | Kelley et al. | |
| 6,039,141 | A | 3/2000 | Denny | |
| 6,061,617 | A | 5/2000 | Berger et al. | |
| 6,065,365 | A | 5/2000 | Ostler et al. | |
| D427,207 | S | 6/2000 | Altmann et al. | |
| D429,246 | S | 8/2000 | Holma | |
| 6,164,285 | A | 12/2000 | Garberg et al. | |
| 6,276,749 | B1 | 8/2001 | Okazawa et al. | |
| 6,433,777 | B1 * | 8/2002 | Sawyer | 345/161 |
| D463,459 | S | 9/2002 | Tamaru et al. | |
| 6,450,284 | B1 * | 9/2002 | Sakyo et al. | 180/329 |
| 6,489,948 | B1 * | 12/2002 | Lau | 345/163 |
| 6,536,825 | B2 | 3/2003 | McAndrew et al. | |
| 6,634,453 | B2 | 10/2003 | Arthur et al. | |
| 6,636,200 | B2 | 10/2003 | Kataoka et al. | |
| 6,640,468 | B2 * | 11/2003 | Menze | 37/234 |
| 6,643,577 | B1 | 11/2003 | Padgett et al. | |
| 6,650,985 | B2 | 11/2003 | Lin et al. | |
| 6,654,004 | B2 * | 11/2003 | Hoggarth | 345/161 |
| 6,765,502 | B2 * | 7/2004 | Boldy et al. | 341/22 |
| 6,843,681 | B2 | 1/2005 | Sanner | |
| 6,948,582 | B2 | 9/2005 | Shiomi et al. | |
| 7,014,255 | B2 * | 3/2006 | Amamiya et al. | 296/190.08 |
| 7,018,158 | B2 * | 3/2006 | Amamiya et al. | 414/636 |
| 7,324,019 | B2 * | 1/2008 | Levenson | 341/22 |
| 2003/0188912 | A1 | 10/2003 | Amamiya | |
| 2004/0256898 | A1 * | 12/2004 | Longueville et al. | 297/217.3 |
| 2005/0072619 | A1 | 4/2005 | Amamiya et al. | |
| 2005/0133292 | A1 * | 6/2005 | Ginzel et al. | 180/315 |

FOREIGN PATENT DOCUMENTS

WO WO-0150608 A1 * 7/2001

OTHER PUBLICATIONS

Belkin Nostromo Game Devices, bit-tech.net, dated Apr. 14, 2002.*

* cited by examiner

MACHINE TOOL CONTROL CONSOLE

TECHNICAL FIELD

The present disclosure is directed to a work machine control console and, more particularly, to a control console that controls optional work machine tools.

BACKGROUND

Work machines such as, for example, motor graders, backhoe loaders, agricultural tractors, and other types of heavy machinery may have a variety of optional work tools that can be attached to and controlled by the work machine. These optional work tools can be relatively complicated and difficult to operate. Each work tool may have a different operator interface with numerous controls for position, orientation, and other associated features and functions.

Historically, work machines have incorporated permanently located single-axis lever control mechanisms with complex mechanical linkages and multiple operating joints, or a plurality of cables to provide the desired work tool functionality. Such control mechanisms require operators with high skill levels to control the many input devices. After a period of operating these control mechanisms, the operators may become fatigued, with no way to rest the hand or arm while operating the various control mechanisms. Further, because an operator's hand may be required to travel from one actuating element to another, an operator's delayed reaction time and the complexity and counter-intuitiveness of the controls may result in poor quality and/or low production. Also, because these single-axis lever control mechanisms are not location-adjustable, they may be inefficiently and/or non-ergonomically-located for all machine operators.

One example of an operator interface designed to reduce operator fatigue and response time while improving results of the work machine is described in U.S. Pat. No. 6,039,141 (the '141 patent) issued to Denny on Mar. 21, 2000. The '141 patent describes an instrumentation arrangement for an off-road vehicle. The arrangement includes co-located control elements, which the operator manipulates to control the vehicle and tool operation. The arrangement also includes an armrest and is movable upon the vehicle to conform to a particular operator's positioning preference.

Although the arrangement of the '141 patent may alleviate some of the problems associated with separate work machine controls, the arrangement may be ineffective for controlling work tools available to a work machine. In addition, because both vehicle and tool operator controls are co-located within the same console, all work machines must be equipped with the entire console regardless of whether or not a particular work machine is equipped with the tools controllable by the console. This requirement may unnecessarily increase the overall cost of the base work machine. Further, the arrangement of the '141 patent may not provide enough support or adjustability to the machine operator.

The disclosed control system is directed towards overcoming one or more of the problems as set forth above.

SUMMARY OF THE INVENTION

A control system for a work machine having at least one work tool includes a rest and a plurality of operator control devices. The plurality of operator control devices are adjustable relative to the rest and configured to control at least one function of the at least one work tool.

An operator station for a work machine having at least one optional work tool includes a seat and a work machine console disposed proximal to the seat. The work machine console is configured to control at least one permanent function of the work machine. The operator station also includes an optional work tool console proximally and removably disposed relative to the work machine console. The optional work machine console includes a rest and a plurality of operator control devices. The plurality of operator control devices is configured to control at least one function of the at least one optional work tool.

A method of controlling at least one work tool on a work machine includes actuating at least one of a plurality of operator control devices to control a function of the at least one work tool. The method further includes positioning at least one of a hand and an arm on a rest and adjusting a location of the plurality of operator control devices relative to the rest.

DETAILED DESCRIPTION

Figure 1:
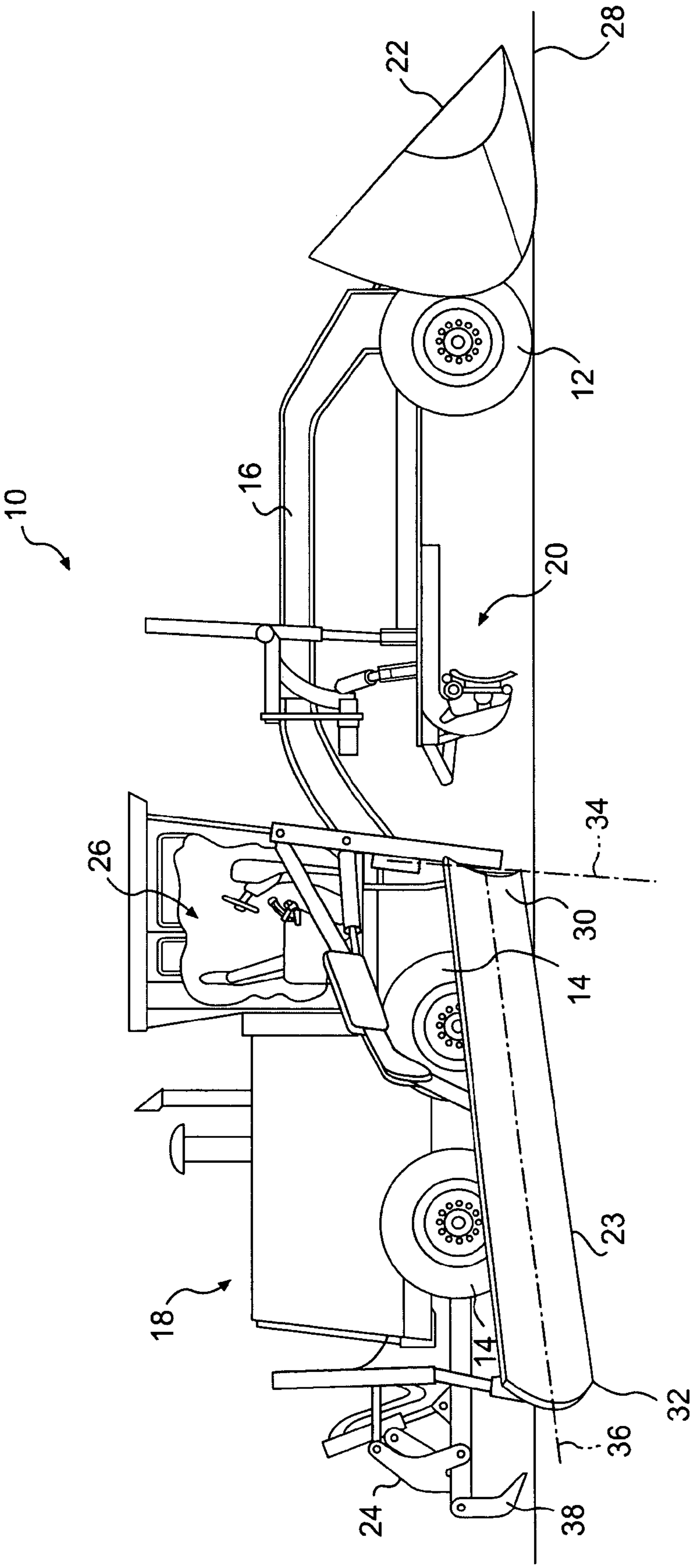
FIG. 1 illustrates a diagrammatic illustration of a work machine according to an exemplary embodiment.

An exemplary embodiment of a work machine 10 is illustrated in FIG. 1. Work machine 10 may be a fixed or mobile machine that performs some type of operation associated with an industry such as mining, construction, farming, or any other industry known in the art. For example, work machine 10 may be an earth moving machine such as a dozer, a loader, an excavator, a motor grader, a dump truck, or any other earth moving machine. Work machine 10 may include a steerable traction device 12, a driven traction device 14, a frame 16 connecting steerable traction device 12 to driven traction device 14, and a power source 18 supported by driven traction device 14. Work machine 10 may also include a permanent work tool 20, a plurality of optional work tools 22-24, and an operator station 26.

Steerable traction device 12 may include one or more wheels located on each side of work machine 10 (only one side shown). Alternately, steerable traction device 12 may include tracks, belts, or other traction devices. The wheels may be rotatable and/or tiltable for use during steering and leveling of a work surface 28. It is contemplated that steerable traction device 12 may also be driven.

Driven traction device 14 may include wheels located on each side of work machine 10 (only one side shown). Alternately, driven traction device 14 may include tracks, belts or other traction devices. It is contemplated that driven traction device 14 may also be steerable.

Frame 16 may connect steerable traction device 12 to driven traction device 14. Frame 16 may include an articulated joint (not shown) that connects driven traction device 14 to frame 16. Work machine 10 may be caused to articulate steerable traction device 12 relative to driven traction device 14 via the articulated joint.

Power source 18 may include an engine (not shown) connected to a transmission (not shown). The engine may be, for example, a diesel engine, a gasoline engine, a natural gas engine, or any other engine known in the art. Power source 18 may also be another source of power such as a fuel cell, a power storage device, or another source of power known in the art. The transmission may be an electric transmission, a hydraulic transmission, a mechanical transmission, or any other transmission known in the art. The transmission may be operable to produce multiple output speed ratios and may be configured to transfer power from power source 18 to driven traction device 14 at a range of output speeds.

For the purpose of this disclosure, the phrase "permanent work tool" may include any tool included as standard equipment with newly produced work machines 10. In one embodiment, permanent work tool 20 may include a drawbar-circle-moldboard assembly (DCM). The DCM may include a blade supported by a center portion of frame 16 via one or more hydraulic ram assemblies, and connected to a front portion of frame 16 via a ball and socket joint (not shown). The DCM may facilitate transverse and rotational movement of the blade in multiple directions and about multiple axis. It is contemplated that the DCM may be omitted, if desired, and replaced with another permanent work tool such as, for example, a ripper, a bucket, a shovel, a scarifier, or another permanent work tool known in the art.

For the purpose of this disclosure, the phrase "optional work tool" may include a work tool that is not included as standard equipment with newly produced work machines 10, but selected by a particular customer or operator for use with work machine 10. In one embodiment, optional work tools 22-24 may include, for example, a plow 22, a side-wing 23, and a ripper 24. It is contemplated that additional or different optional work tools may be included such as, for example, a dozer blade, a scarifier, a bucket, a shovel, or any other work tool known in the art.

Plow 22 may be an tool used to cut, lift, move, or turnover snow or other materials from a central travel path of work machine 10. Plow 22 may be a V-type plow, a one-way-type plow, a reversible-type plow, or any other type of plow for clearing away snow and other materials known in the art. Plow 22 may be hydraulically controllable to move vertically relative to work surface 28. It is contemplated that plow 22 may be further hydraulically controllable to move horizontally and/or to rotate about a vertical and/or horizontal axis. It is also contemplated that plow 22 may be controllable in a manner other than hydraulically.

Side-wing 23 may be used alone, in conjunction with plow 22, and/or in conjunction with the DCM to cut, lift, move, or turnover snow and other materials from a travel path parallel to the central travel path and located to one side of work machine 10. Side-wing 23 may include a pivot end 30 also known as the toe end, and a free end 32 also known as the heel end. Both pivot end 30 and free end 32 may be separately vertically controllable via hydraulic cylinders. In addition, free end 32 may be controlled to swing away from or towards work machine 10 while pivoting about an axis 34 through pivot end 30. Further, the entire side-wing 23 may be controlled to rotate about a horizontal axis 36 to thereby change an angle of side-wing 23 relative to work surface 28. It is contemplated that side-wing 23 may be controllable in a manner other than hydraulically.

Ripper 24 may be used in conjunction with the DCM or with a different work tool such as, for example a dozer blade, or alone to tear up asphalt, hard-packed soil, or other obstacles to aid in a grading operation. Ripper 24 may include one or more teeth 38 that may be hydraulically positioned between vertical high and low positions relative to work surface 28. It is contemplated that ripper 24 may be positioned in a manner other than hydraulically.

Figure 2:
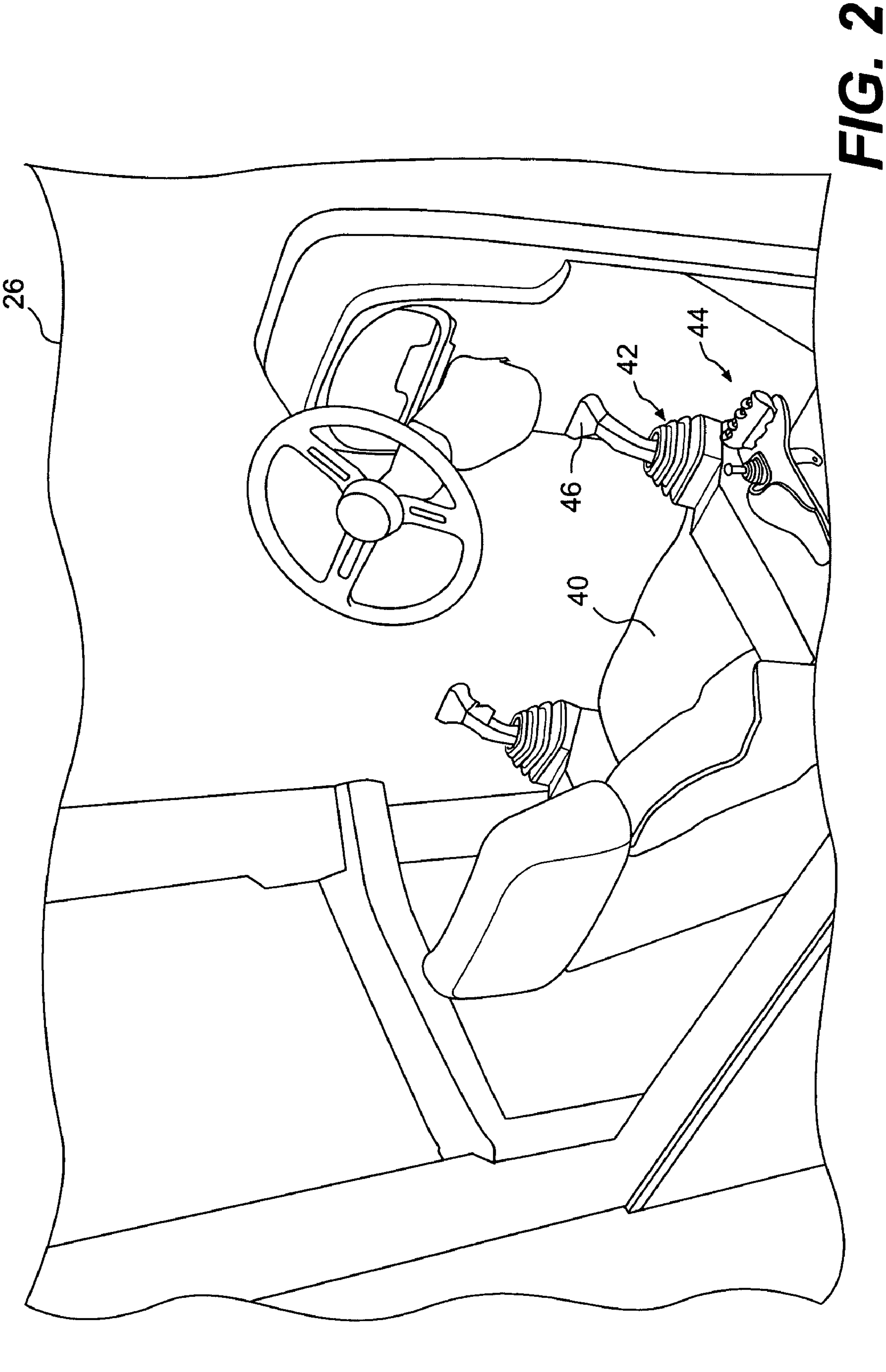
FIG. 2 illustrates a diagrammatic illustration of an operator station according to an exemplary embodiment.

Operator station 26 may be used to control one or more permanent functions of work machine 10 and movements of optional work tools 22-24. As illustrated in FIG. 2, operator station 26 may include a seat 40, at least one permanent control console 42, and an optional control console 44. Permanent control console 42 may be connected to seat 40, to a floor (not shown) of operator station 26, to a wall (not shown) of operator station 26, or in any other manner known in the art. Optional control console 44 may be disposed adjacent to permanent control console 42 and removably attached to permanent control console 42. It is contemplated that optional control console 44 may alternately be removably attached to the floor or wall of operator station 26.

Permanent control console 42 may include at least one operator control device configured to control at least one permanent work tool and/or function of work machine 10. In one embodiment, permanent control console 42 may include a three-axis joystick controller 46 configured to control movement of permanent work tool 20. In particular, a forward-tilting movement of joystick controller 46 may cause a portion of the blade to lower towards work surface 28. An aft-tilting movement of joystick controller 46 may cause the portion of the blade to raise away from work surface 28. A right-tilting movement of joystick controller 46 may cause the blade to shift to the right relative to an operator's perspective. A left-tilting movement of joystick controller 46 may cause the blade to shift to the left. A twisting movement of joystick controller 46 may cause the blade to rotate about a central vertical axis (not shown). It is contemplated that different work tool movements may be associated with different motions of joystick controller 46. It is further contemplated that joystick controller 46 may control additional and/or different work tools or functions of work machine 10. For example, joystick controller 46 may control work machine steering, work machine articulation, wheel tilt, a transmission function, an engine throttling function, and other functions of work machine 10 known in the art. It is further contemplated that different work tool movements may be associated with different motions of joystick controller 46. It is also contemplated that additional and/or different operator control devices may be included in permanent control console 42.

Figure 3A:
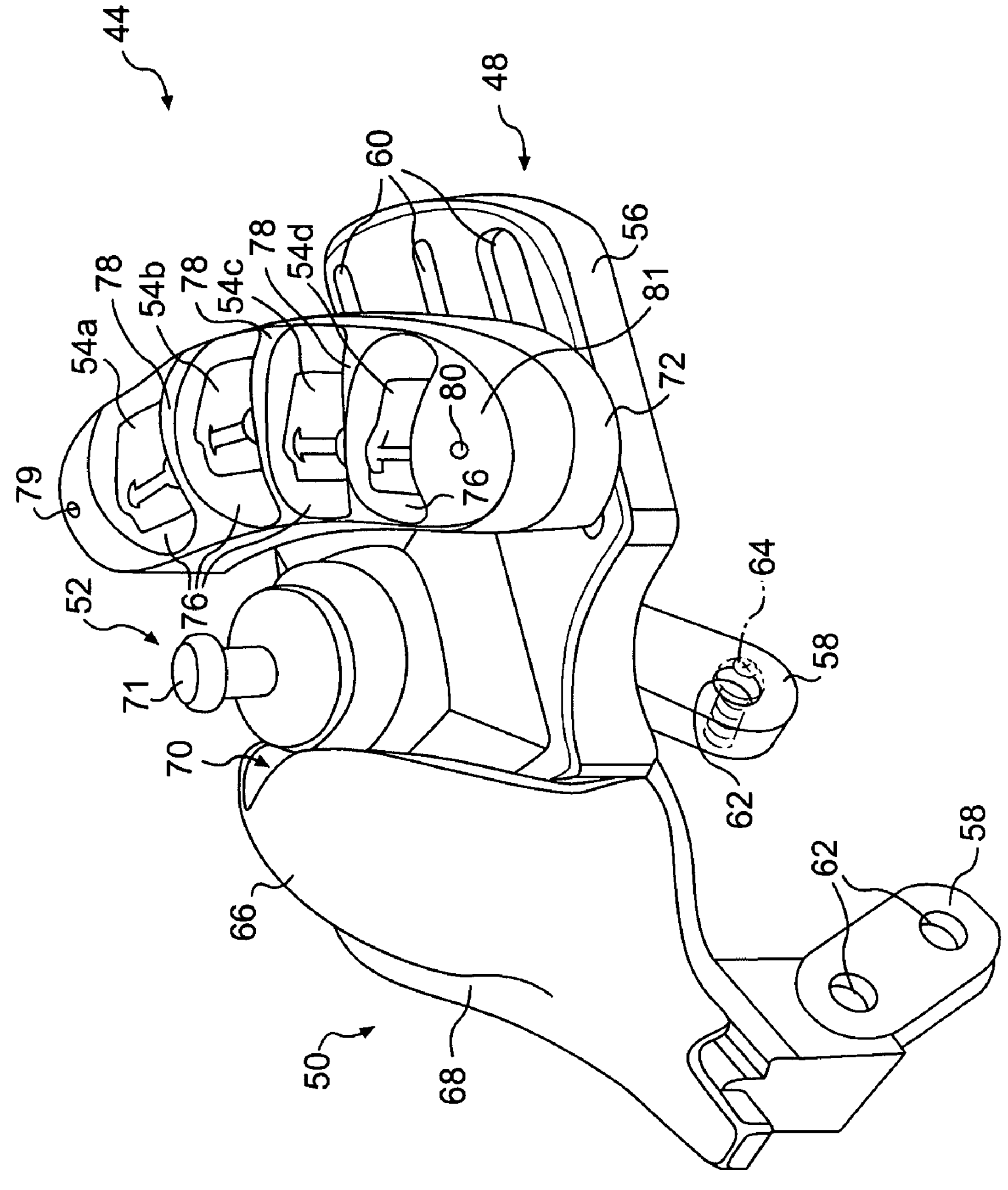
FIG. 3A illustrates a diagrammatic illustration of an optional control console according to an exemplary embodiment.

Optional control console 44 may be removably connectable to work machine 10 and connected when a particular customer or operator purchases and/or attaches an optional work tool to work machine 10. As illustrated in FIG. 3A, optional control console 44 may include a base member 48, a palm rest 50, a joystick controller 52, and a plurality of finger switches 54*a-d*.

Base member 48 may include an upper platform 56 and protruding lower support members 58 that connect optional control console 44 to permanent control console 42. Upper platform 56 may be integral with lower support members 58 or otherwise fixedly connected to lower support members 58. It is contemplated that upper platform 56 may alternately be adjustably connected to lower support members 58. Upper platform 56 may include a plurality of parallel channels 60. In one embodiment, upper platform 56 includes three channels 60. It is contemplated that additional or fewer channels 60 may be included. Each lower support member 58 may include an aperture 62 configured to receive a fastener 64 (only one shown) that engages a threaded hole (not shown) in permanent control console 42. It is contemplated that base member 48 may include additional support members 58 and that each support member 58 may include additional apertures 62.

Palm rest 50 may be connected to upper platform 56 and configured to provide a rest and a support for an operator's hand. In particular, palm rest 50 may include a convex portion 66 configured to match the center portion of an operator's palm, a concave portion 68 configured to accommodate a thumb of an operator's right hand, and a recessed portion 70 configured to accommodate an operator's fingers. Concave portion 68 may be located towards the inside of convex portion 66 relative to an operator's perspective. Recessed portion 70 may be located towards a forward end of convex portion 66, recessed portion 70 being formed from a hollow opening between convex portion 66 and upper platform 56. Palm rest 50 may include padding configured to support and cushion an operator's right hand. Although palm rest 50 illustrated in FIG. 3A is configured to support the operator's right hand, it is contemplated that palm rest 50 may be similarly configured for the left hand.

Joystick controller 52 may be a two-axis, spring-centered speed-proportional controller configured to control a vertical movement of an optional work tool (e.g. plow 22, side-wing 23, ripper 24, etc). In particular, joystick controller 52 may be tiltable about a first axis in a forward direction relative to an operator's perspective to lower free end 32 of optional work tool 23 towards work surface 28, and tiltable about the first axis in an aft direction to raise free end 32 of optional work tool 23 away from work surface 28. Because joystick controller 52 may be speed proportional, a tilt angle of joystick controller 52 may be related to a movement speed of optional work tool 23 in the associated tilt direction.

In addition, joystick controller 52 may have a soft detent in the forward direction to control a float function of free end 32 of optional work tool 23 and a LED float indicator 71. In particular, free end 32 of optional work tool 23 may be caused to enter a float mode when joystick controller 52 is tilted through a predetermined angle in the forward direction and/or held in a predetermined position for a predetermined period of time. LED indicator 71 may illuminate when optional work tool has been caused to enter the float mode. The float function may allow free end 32 of optional work tool 23 to "float" on work surface 28, or to be readily moved by work surface 28 with little resistance. Free end 32 of optional work tool 23 may be caused to exit the float mode by tilting joystick controller 52 about the first axis in the aft direction past a predetermined tilt angle and/or held in a predetermined position for a predetermined period of time.

Joystick controller 52 may also be configured to control a swinging movement of an optional work tool (e.g. plow 22, side-wing 23, ripper 24, etc.). Specifically, joystick controller 52 may be tiltable about a second axis that is orthogonal to the first axis in a right-tilt direction relative to an operator's perspective to cause free end 32 of optional work tool 23 to swing about pivot end 30 away from work machine 10. Joystick controller 52 may also be tiltable about the second axis in a left-tilt direction to cause free end 32 of optional work tool 23 to swing towards work machine 10. It is contemplated that joystick controller 52 may include additional soft detents and that additional or different optional work tools may be controlled by joystick controller 52. It is further contemplated that joystick controller 52 may include only one tilt axis and/or may be twistable to control a movement of optional work tool 23.

Figure 3B:
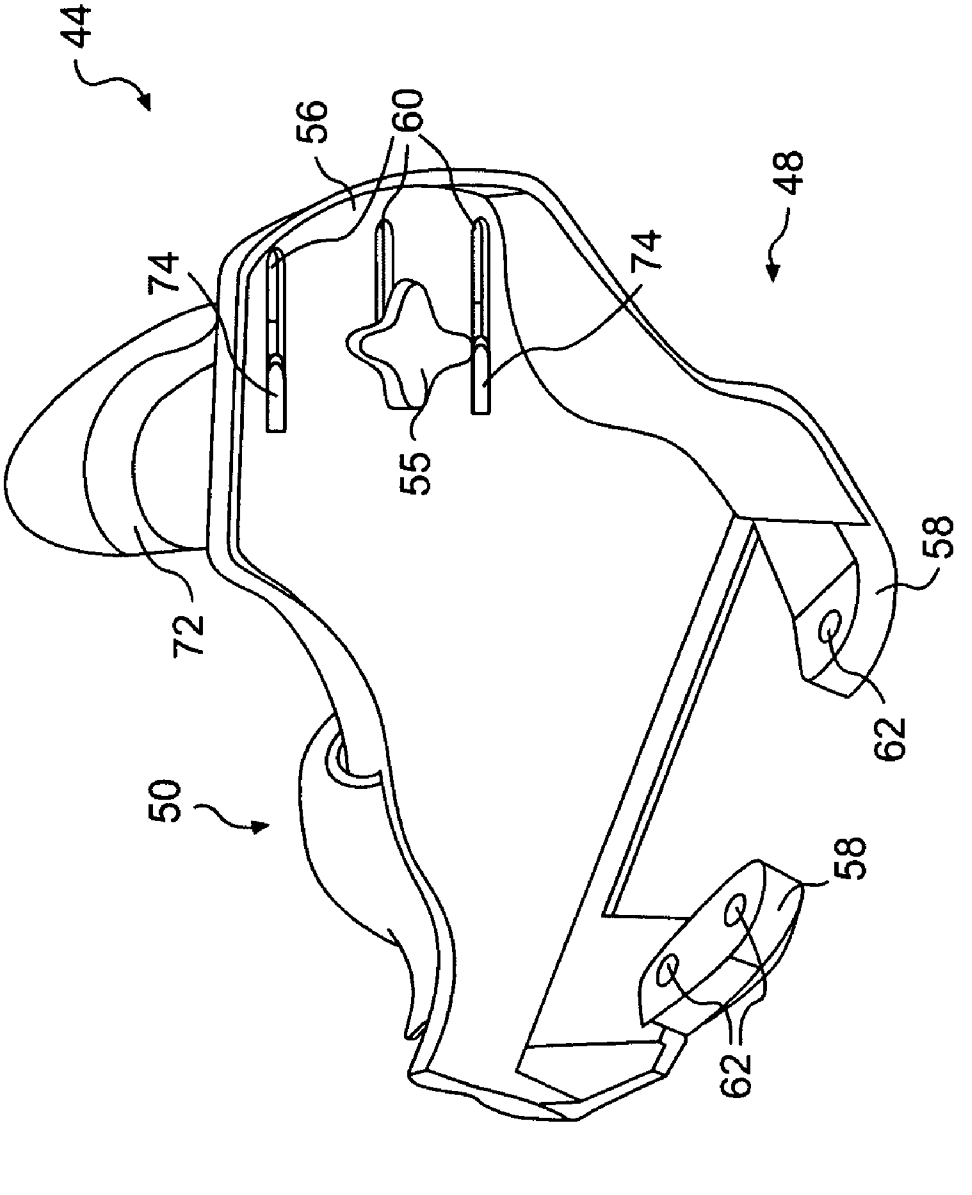
FIG. 3B illustrates a bottom-view diagrammatic illustration of the optional control console of FIG. 3A.

The plurality of finger switches 54*a-d* may be position-adjustable relative to palm rest 50, be configured to ergonomically accommodate an operator's fingers, and include a means for positive finger placement relative to finger switches 54*a-d*. As illustrated in FIG. 3B, finger switches 54*a-d* may be connected to a switch base 72 having a plurality of protruding guides 74. In one embodiment, switch base 72 may include two protruding guides 74 configured to slide within channels 60 of upper platform 56 such that the plurality of finger switches 54*a-d* may be linearly positioned relative to palm rest 50. Each of finger switches 54*a-d* may include a curved surface 76 aligned with a radial extension direction of each associated finger relative to the palm of an operators hand, and may be separated from each other by a partition 78. In addition, a raised end portion 81 located outward from finger switch 54*d* may indicate correct hand placement to an operator as the operator sweeps the hand across optional control console 44 without the operator having to visually confirm correct placement.

Finger switch 54*a* may be a spring centered speed-proportional switch having a soft detent and configured to control vertical movement of an optional work tool (e.g. plow 22, side-wing 23, ripper 24, etc.). For example, finger switch 54*a* may be movable in a forward direction to lower optional work tool 22 towards work surface 28. Finger switch 54*a* may be movable in an aft direction to raise optional work tool 22 away from work surface 28. The soft detent may allow for finger switch 54*a* to be moved in the forward direction past a predetermined position and/or held in a predetermined position for a predetermined period of time to cause optional work tool 22 to enter a float mode. Similar to the float mode of optional work tool 23, the float mode of optional work tool 22 may be associated with a LED float indicator 79 and allow optional work tool 22 to "float" on work surface 28, or to be readily moved by work surface 28 with little resistance. When in the float mode, LED float indicator 79 may illuminate to signal optional work tool 22 being in the float mode. To exit the float mode, finger switch 54*a* may be moved in the aft direction past a predetermined position and/or held in a predetermined position for a predetermined period of time. It is contemplated that the float function of finger switch 54*a* may be omitted, if desired, or actuated in another manner such as, for example, by moving finger switch 54*a* to the aft position rather than the forward position. Because finger switch 54*a* may be speed proportional, a speed of optional work tool 22 may be related to a position of finger switch 54*a* in the associated fore or art direction.

Finger switch 54*b* may be a spring centered speed-proportional switch configured to control vertical movement of an optional work tool (e.g. plow 22, side-wing 23, ripper 24, etc.). For example, finger switch 54*b* may be movable in a forward direction to lower optional work tool 24 towards work surface 28. Finger switch 54*b* may be movable in an aft direction to raise optional work tool 24 away from work surface 28. It is contemplated that finger switch 54*b* may include a soft detent.

Finger switch 54*c* may be a spring centered speed-proportional switch configured to control rotational movement of an optional work tool (e.g. plow 22, side-wing 23, ripper 24, etc.). For example, finger switch 54*c* may be movable in a forward direction to tip an upper portion of optional work tool 23 towards work surface 28. Finger switch 54*a* may be movable in an aft direction to rotate the upper portion of optional work tool 23 away from work surface 28. It is contemplated that finger switch 54*c* may include a soft detent.

Finger switch 54*d* may be a spring centered speed-proportional switch having a soft detent and configured to control vertical movement of pivot end 30 of an optional work tool (e.g. plow 22, side-wing 23, ripper 24, etc.). For example, finger switch 54*d* may be movable in a forward direction to lower pivot end 30 of optional work tool 23 towards work surface 28. Finger switch 54*d* may be movable in an aft direction to raise pivot end 30 of optional work tool 23 away from work surface 28. The soft detent may allow for finger switch 54*d* to be moved in the forward direction past a predetermined position and/or held in a predetermined position for a predetermined period of time to cause pivot end 30 of optional work tool 23 to enter a float mode. Similar to the float mode of free end 32 of optional work tool 23, the float mode of pivot end 30 of optional work tool 23 may be associated with a LED float indicator 80 and allow optional work tool 23 to "float" on work surface 28, or to be readily moved by work surface 28 with little resistance. When in the float mode, LED float indicator 80 may illuminate to signal optional work tool 23 being in float mode. To exit the float mode, finger switch 54*d* may be moved in the aft direction past a predetermined position and/or held in a predetermined position for a predetermined period of time. It is contemplated that the float function of finger switch 54*d* may be omitted, if desired, or actuated in another manner such as, for example, by moving finger switch 54*d* to the aft position rather than the forward position.

FIG. 3B illustrates a means for securing the plurality of finger switches 54*a-d* to upper platform 56 of base member 48. In one embodiment, the means for securing may include a handle 55 having a protruding threaded portion (not shown configured to extend through the center channel 60 of upper platform 56 and engage a threaded portion (not shown) within switch base 72. Other means for securing have been contemplated such as, for example, multiple threaded fasteners, a cam-fastener having a threaded protrusion, a clamp, a linkage system, or other means known in the art.

Optional control console 44 may also include a means (not shown) for powering optional control console 44 and communicating with work machine 10. The means for powering and communicating may include, for example, an electrical wiring harness having one or more connectors configured to engage mating connectors within work machine 10. It is also contemplated that optional control console 44 may wirelessly communicate with work machine 10 and/or include a means (not shown) for self powering.

INDUSTRIAL APPLICABILITY

Optional control console 44 may be applicable to any work machine requiring multiple operator control inputs to position and/or orient optional work tools 22-24. Optional control console 44 may effectively reduce operator fatigue by providing oft-used actuators for optional equipment within very close proximity to each other and to permanent control console 42 in an ergonomically adjustable manner. Locating the oft-used actuators within close proximity to each other may allow the operator to control different optional work tools without extensive operator hand or arm movement between different controllers. Locating the optional work tool controllers within a control console separate from permanent control console 42 allows for a lower cost base work machine. The operation of optional control console 44 will now be explained.

During operation of work machine 10, an operator may control both permanent work machine functions and optional work tools 22-24 with the same hand with little hand and arm movement. In particular, when control of optional work tools 22-24 is desired, the operator may remove the right hand from joystick controller 46 and place it on palm rest 50, which is located immediately outward from permanent control console 42 relative to the operator's perspective.

In addition, while the operator's palm is positioned on palm rest 50, all control mechanisms of optional control console 44 may be accessible substantially simultaneously. Specifically, joystick controller 52 may be moved by the thumb, finger switch 54*a* by the index finger, finger switch 54*b* by the middle finger, finger switch 54*c* by the ring finger, and finger switch 54*d* by the little finger. It is contemplated that the joystick be moved by the thumb and index finger or any other combination of digits. Similarly, it is also contemplated that each of finger switches 54*a-d* may be actuated by any digit.

While operating joystick controller 52 and/or finger switches 54*a-d*, palm rest 50 may provide support to the operator's hand. In particular, concave portion 68 in combination with convex portion 66 may provide a gripping surface for the operator's hand. Further, recess portion 70 combined with convex portion 66 may provide leverage to the operator's hand during movement of joystick controller 52 by allowing the operator's fingers to wrap around palm rest 50 and enter recess portion 70.

To further improve the ergonomic placement of finger switches 54*a-d* relative to the operator's hand in the rested position on palm rest 50, switch base 72 may be adjusted relative to palm rest 50. Switch base 72 may be adjusted by turning handle 55 in a counter-clockwise direction to loosen handle 55, linearly sliding switch base 72 to the desired position, and turning handle 55 in a clockwise direction to tighten handle 55.

Other embodiments will be apparent to those skilled in the art from consideration of the specification and practice of the disclosed embodiments. For example, many different optional work tools may be controlled by joystick controller 52 and/or finger switches 54*a-d*. Those functions and/or features described as being controlled by joystick controller 52 may alternately be controlled by finger switches 54*a-d* and vice versa. Additional or fewer features and/or functions may be controlled by joystick controller 52 and finger switches 54*a-d*. The features and/or functions may be controlled by various operator control devices, other than switches such as, for example, buttons, push/pull devices, levers, disk adjusters, and other operator control devices known in the art. Further, joystick controller 52 and/or switches 54*a-d*, described as causing movement speeds of associated optional work tools proportional to the positions of the controller or switches, may alternately be on/off-type control devices, wherein motion of the affected optional work tools are continuous or step-wise while the controller or switches are in an engaged position. It is intended that the specification and examples be considered as exemplary only, with a true scope of the invention being indicated by the following claims.

What is claimed is:

1. A control console for an earthmoving machine having at least one work tool, comprising:

a rest including a convex surface configured to accommodate a palm of an operator's hand and a recessed portion formed integrally with the rest and configured to accommodate one or more fingers of the operator's hand; and a switch plate linearly adjustable relative to the rest, the switch plate including a plurality of adjacent finger recesses, each finger recess at least partially defined between opposing sides and a finger operable control device, the finger recesses configured to longitudinally receive one of the operator's fingers for operation of the corresponding finger operable control device.

2. The control console of claim 1, wherein at least one of the finger operable control devices is configured to control vertical movement and another is configured to control rotational movement of the at least one tool.

3. The control console of claim 1, further including at least one joystick disposed between the rest and the switch plate.

4. The control console of claim 3, wherein the at least one joystick is configured for two axes of controlling movement.

5. The control console of claim 3, wherein the at least one joystick is operable by the one or more fingers of the operator's hand while the palm of the hand is positioned on the rest.

6. The control console of claim 3, wherein the joystick is configured to control a function when tilted through a predetermined angle in a predetermined direction and/or held in a predetermined position for a predetermined period of time.

7. The control console of claim 6, wherein the function is a float function of the at least one tool.

8. The control console of claim 7, further including at least one LED indicator associated with the float function of the at least one tool.

9. The control console of claim 1, wherein the switch plate is linearly adjustable to allow the palm of the operator's hand to be positioned on the rest while the operator's fingers are positioned within the finger recesses.

10. The control console of claim 9, wherein the switch plate is curved inwardly relative to the convex surface of the rest.

11. The control console of claim 9, wherein at least one of the finger operable control devices is configured to control a function upon being moved in a direction past a predetermined position and/or held in a predetermined position for a predetermined period of time.

12. The control console of claim 11, further including at least one LED indicator associated with the controlled function.

13. The control console of claim 1, wherein the switch plate includes four finger recesses.

14. The control console of claim 1, further including at least one support member extending downwardly from the control console, the support member having at least one mounting aperture.

15. The control console of claim 1, further including a base member having a linear slot, the switch plate having a protruding guide member configured for movement within the linear slot.

16. The control console of claim 15, wherein the base member includes a plurality of linear guide slots and the switch plate includes a plurality of guides, each guide configured for movement within one of the guide slots.

17. The control console of claim 1, including a base member having a fastening slot and a fastener for securing the switch plate to the base member through the fastening slot.

18. The control console of claim 17, the switch plate having a plurality of guides configured for movement within corresponding parallel guide slots of the base member.

19. An operator station for an earthmoving machine having a first machine work tool and a second machine work tool, comprising:

- a seat;
- a first machine console disposed proximal to the seat and configured to control a primary machine function;
- a second machine console removably and proximally disposed relative to the first machine console and configured to control at least the second machine work tool, the second machine console including:
- a rest including a convex surface configured to accommodate a palm of an operator's hand; and
- a switch plate linearly adjustable relative to the rest, the switch plate including a plurality of adjacent finger recesses, each finger recess at least partially defined between opposing sides and a finger operable control device, the finger recesses configured to longitudinally receive one of the operator's fingers for operation of the corresponding finger operable control device.

20. The operator station of claim 19, wherein the second machine console is removably attached to at least one of the first machine console or the seat.

21. The operator station of claim 19, wherein one of the finger operable control devices is configured to move in a forward direction and an aft direction to control a vertical movement of the second machine work tool.

22. The operator station of claim 19, wherein the second machine console further includes a two-axis joystick that controls a float function of the second machine work tool.

23. The operator station of claim 19, wherein the opposing sides are curved to define the finger recesses with a substantially concave cross-section.

24. The operator station of claim 19, wherein the primary machine function is at least one of machine propulsion, machine steering, or operation of the first machine tool.

25. The operator station of claim 19, wherein the first machine tool is a drawbar-circle-moldboard assembly and the primary machine function is operation of the drawbar-circle-moldboard assembly.

26. The operator station of claim 19, wherein the second machine console includes a downwardly extending support member, the support member having at least one mounting aperture, the second machine console being removably attached to at least one of the first machine console or seat via the mounting aperture.

27. The operator station of claim 19, wherein the second machine console includes a base member having a guide slot, the switch plate having a protruding guide member configured for movement within the guide slot.

28. The operator's station of claim 19, further including a base member, the rest positioned on the base member, the base member having a plurality of guide slots, a plurality of guide members protruding from the switch plate, each guide member configured for movement within one of the guide slots.

29. The operator station of claim 19, wherein the second machine console includes a base member having a linear fastening slot and a fastener for securing the switch plate to the base member through the fastening slot.

30. The operator station of claim 29, the switch plate having a plurality of guides configured for movement within corresponding parallel guide slots of the base member.

31. An earthmoving machine, comprising:

- a first machine work tool;
- a second machine work tool; and
- an operator station, including:
- a seat;
- a first machine console disposed proximal to the seat and configured to control at least one primary function of the machine;
- a second machine console removably and proximally disposed relative to the first machine console and configured to control at least the second machine work tool, the second machine console including:
- a base member;
- a rest connected to the base member; and
- a switch plate linearly adjustable relative to the rest, the switch plate including a plurality of adjacent finger recesses, each finger recess at least partially defined between opposing sides and a finger operable control device, the finger recesses configured to longitudinally receive an operator's finger during operation of the finger operable control device; and
- a joystick disposed between the rest and the switch plate.

32. The earthmoving machine of claim 31, wherein the rest includes:

a convex surface configured to accommodate the palm of an operator's hand; and a rest recess configured to accommodate the fingers of an operator's hand.

33. The earthmoving machine of claim 31, wherein one of the finger operable control devices is configured to move in a forward direction and an aft direction to control a rotational movement of the second machine tool.

34. The earthmoving machine of claim 31, wherein the joystick is configured to control a float function of the second machine tool when tilted through a predetermined angle in a predetermined direction and/or held in a predetermined position for a predetermined period of time.

35. A motor grader comprising:

a first frame member supporting a first traction device and a first machine tool;

a second frame member supporting an operator station and a power source drivingly connected to a second traction device;

the first frame member pivotally connected to the second frame member at an articulation joint;

the operator station having a first machine control console configured to control at least one of machine propulsion, machine steering or movement of the first machine tool; and a second machine control console removably and proximally disposed relative to the first machine console and configured to control a second machine tool, the second machine console including:

a rest including a convex surface configured to accommodate a palm of an operator's hand; and a switch plate linearly adjustable relative to the rest, the switch plate including a plurality of adjacent finger recesses, each finger recess at least partially defined between opposing sides and a finger operable control device, the finger recesses configured to longitudinally receive an operator's finger during operation of the finger operable control device.

36. The motor grader of claim 35, wherein the first machine tool is a drawbar-circle-moldboard assembly and the first machine control console is configured to control operation of the drawbar-circle-moldboard assembly.

37. The motor grader of claim 35, wherein the second machine tool is selected from the group consisting of a ripper, side wing, and plow.

38. The motor grader of claim 35, further including at least one joystick disposed between the rest and the switch plate.

39. The motor grader of claim 35, wherein the switch plate is curved inwardly relative to the convex surface of the rest.

40. The switch plate of claim 39, wherein the opposing sides are curved to define the finger recesses with a substantially concave cross-section.

41. The motor grader of claim 35, wherein the switch plate includes four finger recesses.

42. The motor grader of claim 35, further including at least one support member extending downwardly from the second machine control console, the support member having at least one mounting aperture.

43. The motor grader of claim 35, the second machine console further including a base member having a linear guide slot, the switch plate having a protruding guide member configured for movement within the guide slot.

44. The motor grader of claim 35, the second machine console further including a base member having a plurality of guide slots, the switch plate including a plurality of guides, each guide configured for movement within one of the guide slots.

45. The motor grader of claim 35, the second machine console further including a base member having a linear fastening slot and a fastener for securing the switch plate to the base member through the fastening slot.

46. The motor grader of claim 45, wherein the switch plate includes a plurality of guides configured for movement within corresponding parallel guide slots of the base member.

47. The motor grader of claim 35, wherein the second machine console includes a downwardly extending support member, the support member having at least one mounting aperture for connection to the first machine console.

* * * * *